United States Patent [19]

Uenishi et al.

[11] Patent Number: 5,195,159
[45] Date of Patent: Mar. 16, 1993

[54] OPTICAL WAVELENGTH CONVERTER DEVICE

[75] Inventors: Naota Uenishi; Takafumi Uemiya, both of Osaka, Japan

[73] Assignee: Sumitomo Electric Industries, Ltd., Osaka, Japan

[21] Appl. No.: 805,327

[22] Filed: Dec. 10, 1991

[30] Foreign Application Priority Data

Dec. 14, 1990 [JP] Japan .................................. 2-402385

[51] Int. Cl.$^5$ ........................... G02B 6/00; G02B 6/36
[52] U.S. Cl. ..................................... 385/122; 359/326
[58] Field of Search ............................. 359/326–332; 385/122

[56] References Cited

U.S. PATENT DOCUMENTS

| | | | |
|---|---|---|---|
| 4,909,587 | 3/1990 | Okamoto et al. | 359/328 X |
| 5,005,938 | 4/1991 | Itoh et al. | 385/122 X |
| 5,046,817 | 9/1991 | Uenishi et al. | 359/328 |
| 5,058,981 | 10/1991 | Umegaki et al. | 359/328 |
| 5,080,462 | 1/1992 | Goto | 385/122 |

FOREIGN PATENT DOCUMENTS

| | | |
|---|---|---|
| 0342523 | 11/1989 | European Pat. Off. . |
| 0360122 | 3/1990 | European Pat. Off. . |
| 0377988 | 7/1990 | European Pat. Off. . |
| 0430183 | 6/1991 | European Pat. Off. . |
| 1-287531 | 11/1989 | Japan . |
| 2-15434 | 1/1990 | Japan . |

Primary Examiner—Akm E. Ullah
Attorney, Agent, or Firm—Cushman, Darby & Cushman

[57] ABSTRACT

A light source device that converts a beam of light radiated from an optical fiber-type second-harmonic generating element to a parallel beam of light filled with a bundle of rays up to a central portion of the parallel beam by causing a portion of the beam of light to pass through an apex of a conical surface. The light source device is unlikely to be affected by the spherical aberrations of members constituting an optical system such as lenses, which makes it unnecessary to make the component members of the optical system special, thereby simplifying the optical system.

8 Claims, 4 Drawing Sheets

OPTICAL WAVELENGTH CONVERTER DEVICE

BACKGROUND OF THE INVENTION

1. Field of the Invention

The present invention relates to a light source device which generates a second-harmonic from laser light, using a second-harmonic generating element, and converts the second harmonic to a parallel beam of light filled with a bundle of rays up to a center portion of the beam.

2. Description or the Related Art

The nonlinear optical effect can be described as follows. when light is made incident upon a nonlinear optical material, there occurs a polarization proportional to a term of a higher degree than the square of the electric field of that light. The second harmonic is generated by this phenomenon.

Inorganic materials such as $KH_2PO_4$ and $LiNbO_3$ are examples of nonlinear optical materials. Organic materials typified by 2-methyl-4-nitroaniline (MNA) can also be used since they have large nonlinear optical coefficients.

In addition, wavelength converting elements for reducing in half the wavelength of a low-output laser beam, such as a semiconductor laser, by using the aforementioned nonlinear optical material as the second-harmonic generating element have been used. Such a wavelength converting element is designed to contain a fundamental wave, such as semiconductor laser light, for the harmonic at a high energy density and to extend the length of interaction with the harmonic.

For this reason, an optical waveguide type, for instance, is used as the form of the second-harmonic generating element. This optical waveguide type is so arranged that an elongated optical waveguide portion, for allowing light to be propagated by being contained within the same, is formed on a substrate and is covered with an overlayer thereon. However, in order to collimate the second-harmonic generated by the optical waveguide portion and the like, the optical waveguide must be structured in such a manner as to cope with the phase velocity of propagation of the second harmonic of the relevant wavelength. That is, the fundamental wave and the second harmonic wave must be phase-matched. To obtain this phase matching, various methods have been conceived. The simplest method known is a second-harmonic generating element using a Cerenkov radiation method.

In the Cerenkov radiation method, as shown in FIG. 6, a second harmonic generated from light being propagated through an optical waveguide portion 11 of an optical waveguide type second-harmonic generating element at a point A, enters base 12 and overlayer 13 at an angle $\theta$. When the equiphase plane of a second harmonic generated at point B, in the direction of $\theta$, and the equiphase plane of the aforementioned second harmonic coincide with each other, a second harmonic wave emerges in the direction of the angle $\theta$. The phase of the second harmonic wave matches with the phase of the fundamental wave when the refractive index of the substrate with respect to the fundamental wave is $n_s(\omega)$, the refractive index of the waveguide portion is $n_G(\omega)$, and the refractive index of the substrate with respect to the second harmonic is $n_s(2\omega)$, insofar as the condition:

$$n_s(2\omega) > n_G(\omega) > n_s(\omega)$$

is met.

However, in the second-harmonic generating element of the optical waveguide type, since the second-harmonic is radiated from the optical waveguide portion having a small width to base, the light beam is crescent-like in cross section so that the light cannot be focused to a small spot. Hence, it is difficult to make use of this second harmonic in the writing and reading of an optical storage medium having fine pits such as an optical disk.

In contrast, since the second-harmonic generating element of an optical fiber type is axially symmetric, the second harmonic expands in an annular manner and can be converted to a parallel beam of light.

Accordingly, a light source device has been proposed which comprises a laser light source, an optical fiber-type second-harmonic generating element emitting a second harmonic from laser light emitting from the laser light source, and a collimator lens having a circularly symmetric, inclined surface and adapted to convert the second harmonic emergent from the second-harmonic generating element to a parallel beam of light, Japanese Patent Application Laid-Open No. 1-287531.

In accordance with the light source device having the above-described arrangement, if the laser light emitting from the laser light source is introduced to the optical fiber-type second-harmonic generating element to generate the second harmonic, the second harmonic expands from the end face of the optical fiber in the form of a wave having an axially symmetric and a conical equiphase plane.

FIG. 7 shows this manner, and the second harmonic expands as a conical beam B through a cladding 42 of an optical fiber 4. Accordingly, as the second harmonic is passed through a collimator lens having a circularly symmetric, inclined surface at least partially, it is possible to obtain a parallel beam of light of the second harmonic.

However, although the light emitting from the above-described light source device is capable of focusing the light to a spot, since the light is annular and the central portion thereof is missing, i.e. a doughnut-shaped light beam, paraxial approximation cannot be applied. Hence, there is a drawback in that this light source device is susceptible to the effect of spherical aberrations of members constituting an optical system, such as lenses. In addition, when the light source device is used for an optical disk device, it is necessary to specially redesign the structure of an optical detector for collimating an astimatism signal so as to detect a tracking error, Japanese Patent Application Laid-Open No. 2-15434.

Accordingly, it is preferable, if it is possible, to generate a light beam which is filled with a bundle of rays up to a central portion of the beam.

Hence, it is conceivable to obtain a beam filled with a bundle of rays up to a central portion of the beam by grinding the distal end of a conical ends 10 and by bringing it into contact with the emergent end face of the fiber, as shown in FIG. 8. However, this method has a problem in that damage is liable to occur of the ground surface of the fiber at the time of alignment between the fiber 4 and the lens 10.

SUMMARY OF THE INVENTION

An object of the present invention is to provide a light source device which has a conical collimator lens for converting the second harmonic emergent from an optical fiber-type second-harmonic generating element to a parallel beam of light, and is capable of readily producing a light beam filled with a bundle of rays up to a central portion of the beam.

A laser light source emits a laser light made incident upon an optical-fiber type second-harmonic generating element which generates a second harmonic. The second harmonic is phase matched with the fundamental wave and emitted from the second-harmonic generating element as a doughnut-shaped bundle of rays at an angle away from the central portion thereof. The doughnut-shaped bundle of rays is made incident upon a lens that has at least one conical surface having an apex. The lens is arranged in such a manner that at least a portion of the bundle of rays passes through the apex. The bundle of rays radiated therefrom is no loner doughnut-shape at an angle away from the central portion thereof, but is now in the form of a parallel light beam filled with a bundle of rays up to the central portion of the parallel light beam.

DETAILED DESCRIPTION OF THE PREFERRED EMBODIMENTS

Figure 1:
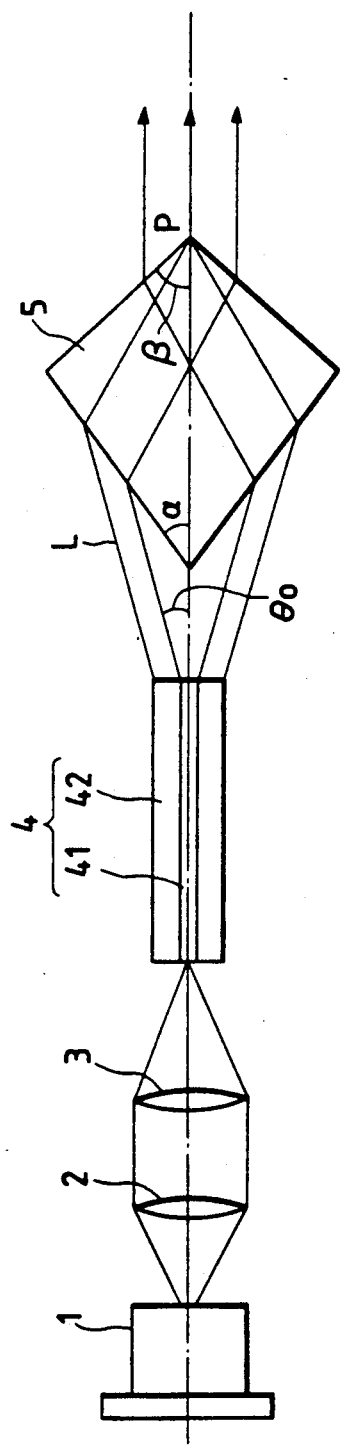
FIG. 1 is a schematic diagram illustrating an embodiment of a light source device according to the invention.

Referring now to the drawings, a description will be given of the embodiments of the present invention. FIG. 1 is a schematic diagram of a first embodiment of a light source device according to the present invention. Laser light is provided by a laser light source 1 such as, for example, a semiconductor laser. A spherical lens 2 collimates laser light generated by the laser light source 1. A spherical condenser lens 3 condenses collimated light from lens 2. Light from condenser lens 3 impinges on a first end of an optical fiber-type second-harmonic generating element 4. Element 4 utilizes a nonlinear optical material such as MNA for either or both of a core 41 and a cladding 42. Light output from element 4 impinges on a solid conical collimator lens 5 with a refractive index n having two conical surfaces and apex angles 21 and 21. Collimator lens 5 collimates the second harmonic generated by the optical fiber-type second-harmonic generating element 4. The second harmonic emerges from the optical fiber-type second-harmonic generating element 4 as a doughnut shaped beam of light at a fixed angle $\theta_o$ with respect to the axis of rotation symmetry of the optical fiber-type second-harmonic generating element. Because the collimator lens 5 has two conical surfaces having apex angles $2\alpha$, $2\beta$, respectively, if the axis of rotation symmetry of the collimator lens 5 is set to be parallel with the axis of rotation symmetry of the optical fiber, and n, $\alpha$ and $\beta$ are selected in such a manner that:

$$\cos(\alpha-\beta)\cos(\alpha-\theta_o) + \sin(\alpha-\beta)\{n^2 - \cos^2(\alpha-\theta_o)\}^{\frac{1}{2}} = \cos\beta$$

and if the position of the collimator lens 5 is set in such a manner that a bundle of rays L corresponding to an outermost periphery of the emergent conical light of the optical fiber converges at a distal end P of the collimator lens 5, then the emergent light beam is no longer a doughnut-shaped light beam but is now a parallel beam of light filled with a bundle of rays up to the central portion of the beam.

The aforementioned Formula (1) is a condition for obtaining a parallel beam of light, and can be derived easily by using Snell's law.

Figure 2:
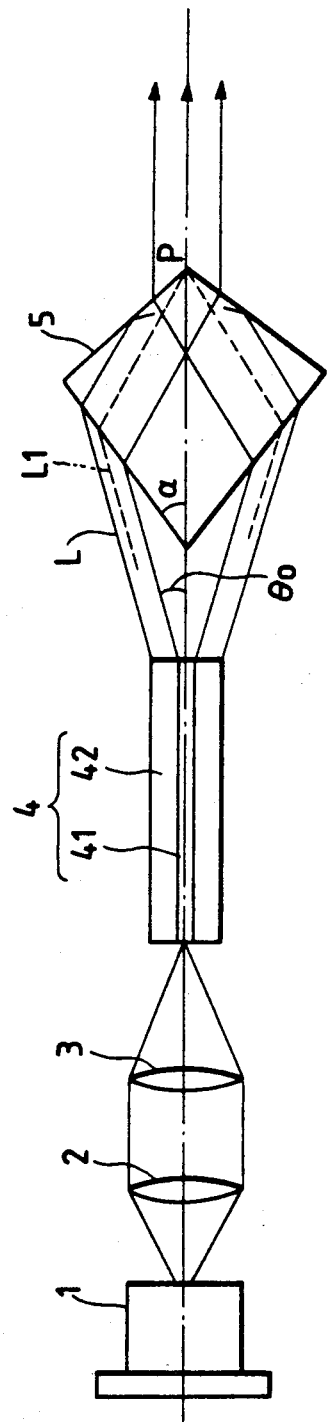
FIG. 2 is a schematic diagram illustrating another embodiment of the light source device.

The present invention is not limited to the above-described embodiment. It is possible to obtain a beam of light which contains a central portion if the bundle of rays, which is not at the outermost periphery of the conical emergent light of the optical fiber, passes through the distal end P. FIG. 2 illustrates this case. A bundle of rays L1, which is not at the outermost periphery of the conical emergent light, passes through the distal end P. A bundle of rays, which is closer to an inner peripheral portion than the bundle of rays L1, is refracted by the conical surfaces of the collimator lens 5, and emerges in the form of a parallel beam of light, while a bundle of rays closer to an outer peripheral portion than the bundle of rays L1 is totally reflected by the conical surfaces. Accordingly, not all the bundles of rays can be made parallel. At least the bundles of rays radiated closer to the inner peripheral portion than the bundle of rays L1 can be collimated.

Figure 3:
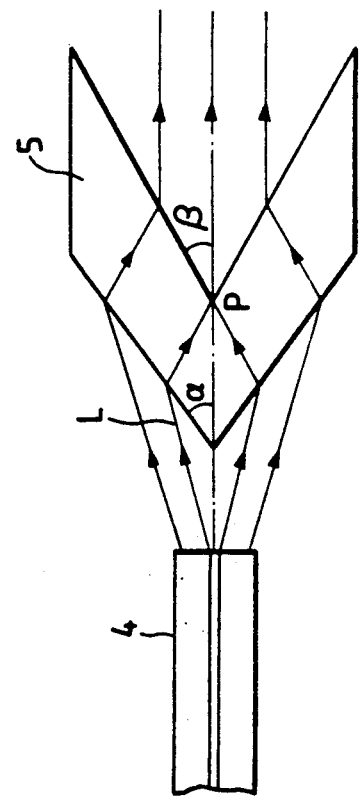
FIG. 3 is a diagram illustrating a modification of a collimator lens.
Figure 4A:
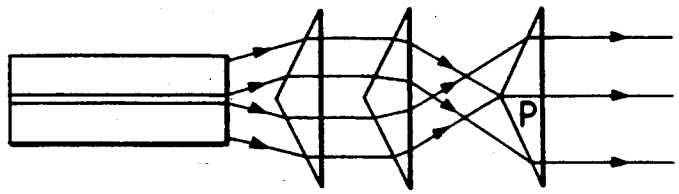
FIG. 4(a)-4(f) are diagrams illustrating various modifications of the collimator lens.
Figure 4B:
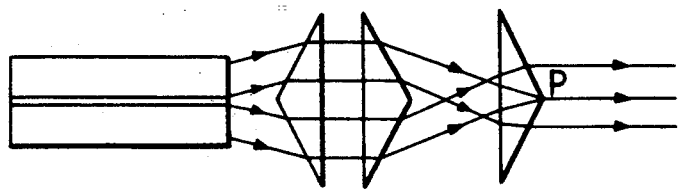
Figure 4C:
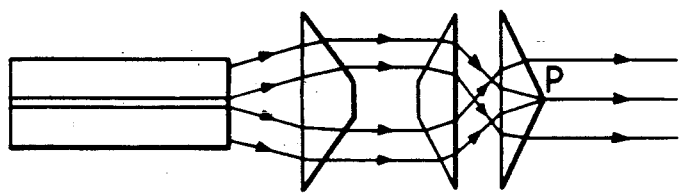
Figure 4D:
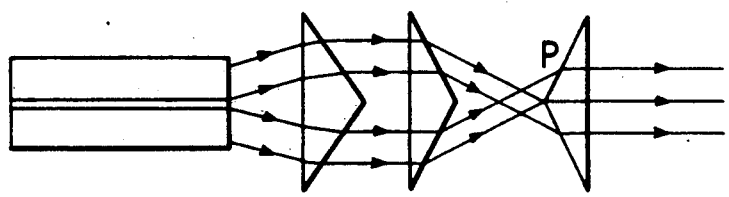
Figure 4E:
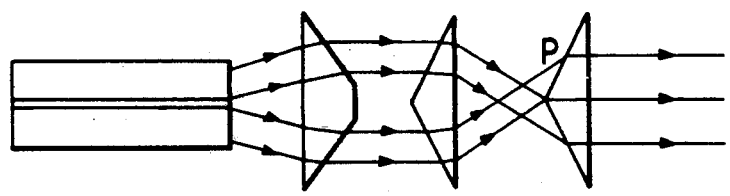
Figure 4F:
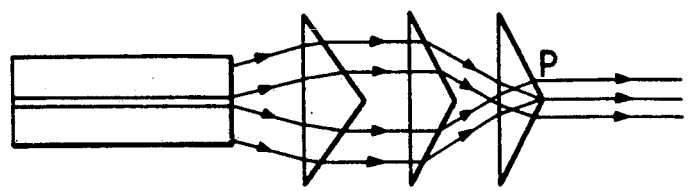
Figure 5A:
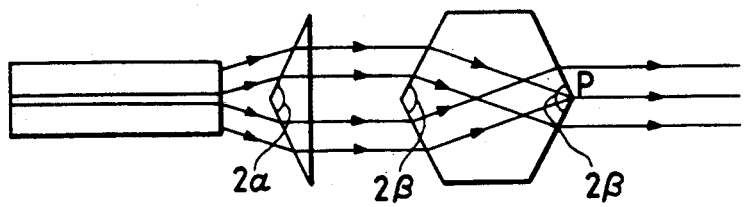
FIG. 5(a)-5(f) are diagrams illustrating various other modifications of the collimator lens.
Figure 5B:
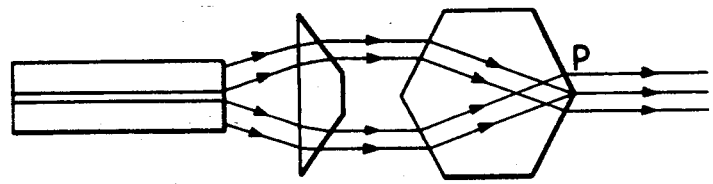
Figure 5C:
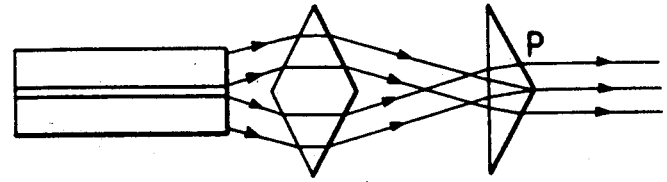
Figure 5D:
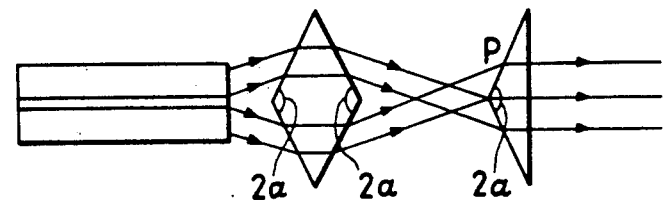
Figure 5E:
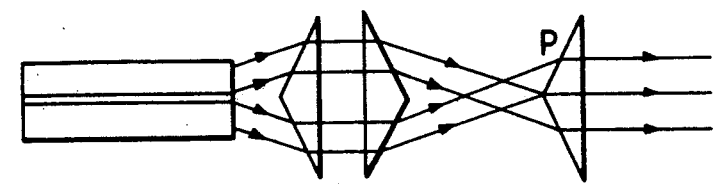
Figure 5F:
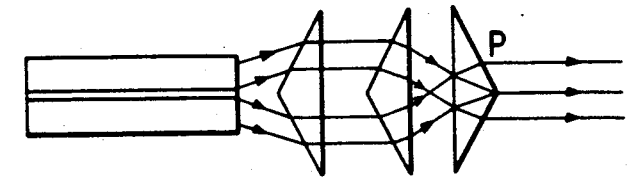
Figure 6:
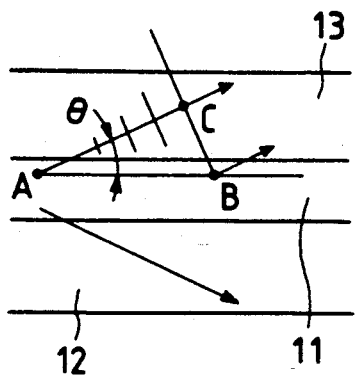
FIG. 6 is a diagram explaining a Cerenkov radiation method.
Figure 7:
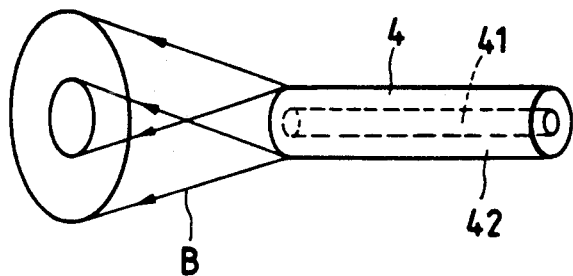
FIG. 7 is a diagram illustrating a beam made emergent in the form of a conical wave surface according to a conventional device.
Figure 8:
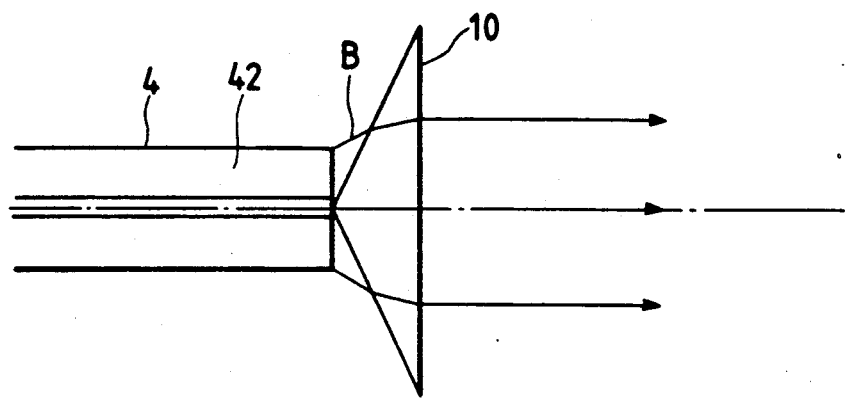
FIG. 8 is a schematic diagram for bringing the distal end of a conical lens into contact with an emergent end face of a fiber so as to obtain a beam of light filled with a bundle of rays up to a central portion of the beam.

The configuration of the above-described collimator lens 5 is not limited to two convex cones. For example, as shown in FIG. 3, the collimator lens 5 may be such that one conical surface is convex, and the other conical surface is concave.

In addition, the number of the conical surfaces is not limited to two, and may be, for example, three. FIGS. 4(a) to 4(f) and FIGS. 5(a) to 5(f) show lens systems in which three conical surfaces are formed by using two or three lenses, respectively. What is common to all, however, is that the bundle of rays unfailingly passes through one point P on the axis of rotation symmetry. The other conical surfaces need not necessarily be conical surfaces each having an apex, and may be surfaces in which their heads are cut off flatly (see FIGS. 4(c), 4(e) and 5(b)).

In each of the above-described cases, a parallel beam filled with a bundle of rays up to a central portion thereof can be made emergent from the collimator lens 5. By condensing this beam by a known condensing means, it is possible to obtain a spot virtually corresponding to a limit of the wavelength of light.

As described above, in accordance with the light source device of this invention, at least a portion of the bundle of rays radiated from the optical fiber-type second-harmonic generating element unfailingly passes through the apex of the conical surface, and is radiated therefrom in the form of a bundle of rays constituting a central portion of the parallel beam of light. Therefore, it is possible to obtain a parallel beam of light filled with the bundle of rays up to the central portion of the beam. Accordingly, the light source device is unlikely to be affected by the spherical aberrations of members constituting the optical system, such as lenses, which makes it unnecessary to make the component members of the optical system special, thereby simplifying the optical system.

We claim:

1. An optical wavelength converter device comprising:
    a laser light source;
    a second-harmonic generating means for generating a second-harmonic of laser light from said laser light source incident thereupon; and
    lens means for converting a beam of light radiated from said second-harmonic generating means to a parallel beam of light filled with a bundle of rays up to a central portion of the parallel beam, said lens means comprising at least one conical surface having an apex, said lens means being arranged in such a manner that at least a portion of the beam of light radiated from said second-harmonic generating means passes through said apex.

2. An optical wavelength converter device according to claim 1, wherein the second-harmonic generating means comprises an optical fiber-type second-harmonic generating element.

3. An optical wavelength converter device according to claim 2, wherein the lens means comprises a collimator lens having a plurality of circularly symmetric, inclined surfaces, at least one circularly symmetric, inclined surface is formed as a conical surface having an apex, and said collimator lens is arranged in such a manner that at least a portion of a beam of light radiated from said second-harmonic generating means passes through said apex.

4. An optical wavelength converter device according to claim 3, wherein the collimator lens comprises two convex conical surfaces.

5. An optical wavelength converter device according to claim 3, wherein the collimator lens comprises a convex conical surface and a concave conical surface.

6. An optical wavelength converter device according to claim 3, wherein the collimator lens comprises at least one conical surface with an apex cut off flatly.

7. An optical wavelength converter device according to claim 2 wherein the lens means comprises three conical surfaces, at least one conical surface having an apex, and said lens means is arranged in such a manner that at least a portion of a beam of light radiated from said second-harmonic generating means passes through said apex.

8. An optical wavelength converter device according to claim 7, wherein at least one conical surface has an apex cut off flatly.

* * * * *